Figure 1:
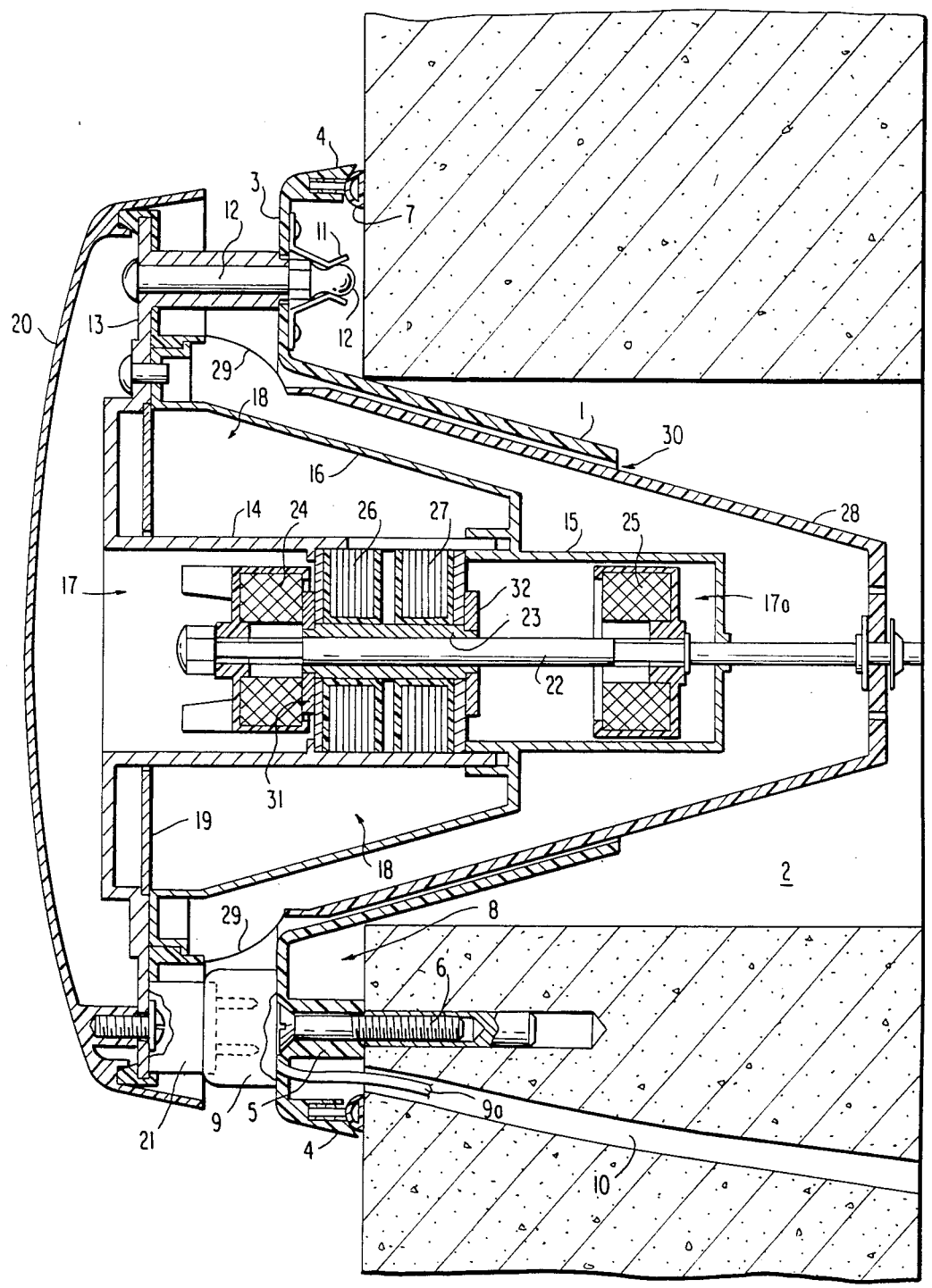

United States Patent [19]

Thiebaud

[11] Patent Number: 4,690,372

[45] Date of Patent: Sep. 1, 1987

[54] AUTOMATIC REGULATING VALVE OF THE AIR FLOW SUCKED OUT OF A ROOM THROUGH A MECHANICAL VENTILATING INSTALLATION

[76] Inventor: Marius Thiebaud, 301, Route de Suisse, CH-1298 Celigny, Switzerland

[21] Appl. No.: 874,034

[22] Filed: Jun. 13, 1986

[30] Foreign Application Priority Data

Jul. 1, 1985 [CH] Switzerland .................. 02800/85

[51] Int. Cl.⁴ .................................... F16K 31/08
[52] U.S. Cl. ............................. 251/129.1; 251/65; 251/129.22; 98/41.2
[58] Field of Search ............ 251/65, 129.1, 129.22; 98/41.2

[56] References Cited

U.S. PATENT DOCUMENTS 1,200,375 10/1916 Litle, Jr. .......................... 251/129.1
3,203,447 8/1965 Bremner et al. ................. 251/65 X
3,332,045 7/1967 Rodaway ......................... 251/65 X
4,383,477 5/1983 Nilsson et al. ..................... 98/41.2

FOREIGN PATENT DOCUMENTS 1417994 10/1965 France .
569938 11/1975 Switzerland .
579244 8/1976 Switzerland .
580258 9/1976 Switzerland .

Primary Examiner—Arnold Rosenthal
Attorney, Agent, or Firm—Young & Thompson

[57] ABSTRACT

It comprises an actuating device (22 to 27) of the obturating member (16) provided with a sliding shaft (22) fast with the obturation member, and carrying two permanent magnets (24, 25) separated the one from the other through a distance defining the variation of the cross-section of the passage of the air channel. It comprises further at least one coil (25, 27) enabling to create a magnetic field.

7 Claims, 2 Drawing Figures

AUTOMATIC REGULATING VALVE OF THE AIR FLOW SUCKED OUT OF A ROOM THROUGH A MECHANICAL VENTILATING INSTALLATION

Many buildings are equipped with mechanical ventilation installations which comprise a central canal merging out generally on the roof of the building in which a sucking of air is created by means of a fan. Each room having to be ventilated is connected to this central canal by a secondary channel through the intermediary of an automatic valve enabling to reduce the hour flow rate of the air sucked out of the considered room when this room is not occupied in order to diminish the loss of calories.

Such regulating valves for the flow rate of air has been proposed and are described for example in the Swiss Pat. Nos. 569,938; 579,244 and 580,258. These existing valves do not give entire satisfaction however since they necessitate for their control permanent electric energy, they are noisy, particularly during their closing and often when they are in minimum flow rate position they cause a whistle due to the laminating of the air. Furthermore, their electric connection necessitates a particular installation, which is visible and therefore non aesthetic. Finally, they are difficult to dismantle so that their cleaning is practically never made.

The present invention has for its object an automatic regulating valve of the air flow sucked from a room through a mechanical ventilation installation tending to obviate to the drawbacks of the precited valves.

Figure 2:
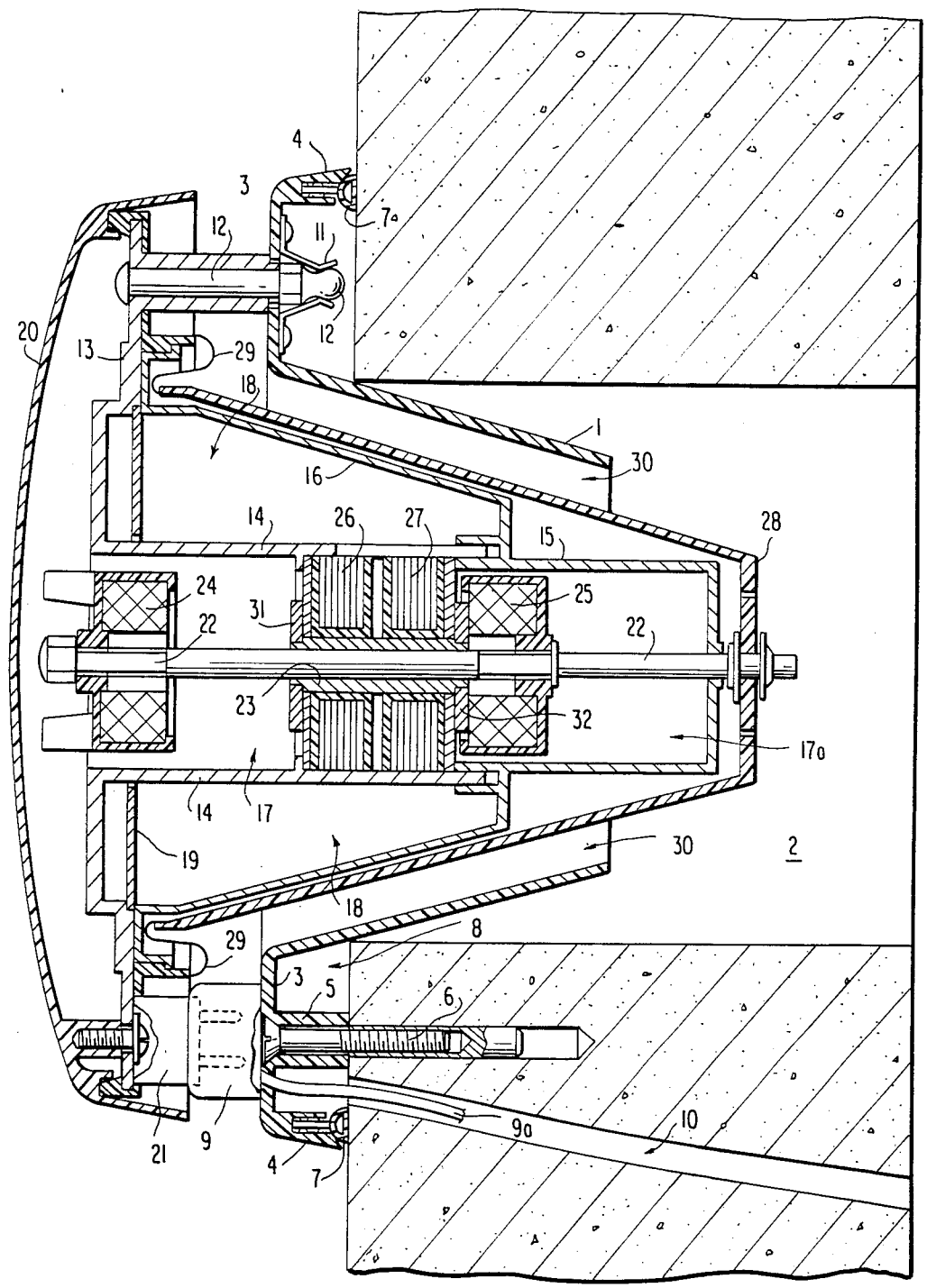

In the drawings:

FIG. 1 shows schematically and by way of example an axial cross-section of the valve in one of its two working positions; and FIG. 2 shows the other of the two working positions.

The automatic valve shown comprises a fixed portion, intended to be rigidly fixed against the wall over the output of a secondary ventilation channel, and a removal part containing the regulating member of the flow and its control device.

The fixed portion is constituted by a ring, generally made out of plastic material, which is circular and present a central conical skirt 1 extending towards the inside of the secondary ventilation channel 2, as well as a flange 3 the outside wall of which 4 rests against the frontal face of the wall around the ventilation channel 2. This flange 3 comprises guides 5 intended to give passage to screws 6 to fix this fixed part against the wall.

The external wall 4 of the flange is provided with a supple gasket 7 which is deformed against the wall and ensures a tightness between this wall and the fixed portion of the valve avoiding thus any air sucking between the wall and this fixed portion and thus any deposit of dirt around this fixed portion of the valve.

The flange 3, 4 of the fixed portion of the valve defines with the wall an annular housing 8.

A female plug 9 is fastened to the flange 3 and can be connected to an electric cable 9a coming out of a conduct 10 provided in the wall under the flange 3. Thus the electric connection is completely hidden.

The flange 3 of the fixed portion comprises further clipping means 11 of the movable portion formed by supports fast with the flange 3, the frontal part of which has an aperture which is resiliently deformable intended to give passage to a pin 12 fastened with the removable portion of the valve. These fixing pins 12 are carried by an annular plate 13 fast with a central cylinder 14 cooperating with a piece presenting a cylindrical part 15 fitting on the free edge of the cylinder 14 and a frustoconical portion 16 fixed to the plate 13. These two pieces 13, 14 and 15, 16 constitute the body of the removable portion of the valve and define a central housing which is cylindrical 17, 17a receiving the actuating device of the valve as well as an annular housing 18 containing certain electronic elements of the control of the valve, carried for example by a printed circuit 19.

A cover 20 is fastened on the plate 13 and constitutes the visible portion of the valve when it is in service position.

This plate 13 carries also a male plug 21 cooperating in service position, pluged in the fixed portion, with the female plug 9 of this fix portion enabling the electric feeding of the control device of the valve.

The actuating device of the valve comprises a central shaft 22 sliding in a tube 23 fast with the part 13, 14 and carrying two permanent magnets 24, 25 located respectively in housing 17, 17a. One at least of these permanent magnets 24 is fixed in a adjustable manner on the shaft 22 to enable to vary the distance separating the two magnets 24, 25.

Around the tube 23 are located two coils 26, 27 fed by the control device.

The free end of the shaft 22 crosses the bottom of the cylindrical portion 15 and is fastened to the center portion of an obturating membrane 28 made out of synthetical rubber or natural rubber, the edge of which is fastened to the plate 13. The membrane 28 comprises a very supple portion 29 whereas the rest of it is relatively rigid and constitutes a wall extending between the skirt 1 and the outside wall of the part 16 defining thus a passage 30 of variable cross-section according to the position of the shaft 22 and thus of the membrane 28.

In normal working conditions, the valve is in the state shown in the upper half of the figure of the drawing. The permanent magnet 24 rests against the iron washer 31 and maintains the shaft 22 and the membrane 28 in their forward position for which the passage 30 has a low cross-section. Thus the air flow sucked is reduced to diminish the loss of calories. The valve remains in this state as long as the room in which it is installed is not used.

However, as soon as the room is in service and that the user lightens this room, the coils 26, 27 are set under tension during a given time interval, relatively short, so as to create a magnetic field pushing the permanent magnet 24 and pulling the permanent magnet 25 causing the passage of the valve into its open state shown in the bottom part of the figure of the drawing for which the cross-section of the passage 30 is great.

The shaft 22 has been displaced backwardly, the membrane 28 has come near the wall 16 and these elements are maintained in this position by the permanent magnet 25 locked on the iron washer 32. The current flowing through the coils 26, 27 is interrupted after a few seconds.

In order to replace the valve in low flow rate position, it suffices to create for a given time a magnetic field in the reverse direction by means of the coils 26, 27 causing the displacement of the shaft 22 in the opposed direction.

The advantages of this solution resides in the use of permanent magnets limiting the energy necessary for the working of the valve to a few impulsion of low duration. One realises thus a saving of energy and avoid any overheating.

It is evident that by means of the electronic control, it is possible to introduce a time delay for the return to the closed state of the valve after the user has shut off the light of the room. This time delay can be of a predetermined duration.

The control of the valve can also be self controlled and not connected to the lighting of the room.

The principal advantages of the valve described are the following:

1. Its electrical connection is not visible, hidden by the fixed portion of the valve which is fastened to the wall.

2. It comprises a removal portion, plugable onto the fixed portion, enabling its easy withdrawal in order to make a cleaning of the air channel if necessary.

3. The electrical connection of the actuating device of the valve housed in the removable portion of it is automatically made when this removable portion is pluged onto the fixed portion.

4. The motor windings of the valve causing its modification of states are nt permanently under tension, reducing thus the energy consumption, the calories produced and the noise.

5. The cross-section of the air passage is adjustable by modifying the distance between the permanent magnets carried by the shaft 22.

6. The flow of air is made in a laminar way due to the shape of the passage 30 avoiding noise and whistlings.

The electronic control of the actuating device is made by means of existing elements. It is necessary, when an alternative electric current is fed to the plug 9 to cause the passage of a direct current within the coils 26, 27 during a given time and also during the interruption of the feeding of the alternative current, after a given delay, to cause the passage of a continuous current of reverse direction during a given time within the coils 26, 27.

This can be realised by means of a rectifier, an inverser, an accumulator and delay circuits in a conventional manner. All these elements of the control are located within the space 18 of the removal portion of the valve.

One of the most important characteristics of this valve resides in the fact that its "open" respectively "closed" position or of reduced flow rate are both stable positions in which the movable members of the valve remain in place naturally, under the effect of permanent magnets, without any waste of energy or use of springs or any other mechanical elements submitted to wearing off.

I claim:

1. Automatic regulating valve of the air flow sucked out from a room through a mechanical ventilation installation comprising a channel to suck air the cross-section of which depends on the position of an obturating member subjected to the action of an acuating device itself controlled by a control device, the actuating device of the obturation member comprising a shaft sliding axially in a portion of the body of the valve, one end of which is fast with the obturation member, two permanent magnets carried by said shaft and separated the one from the other by a distance defining the variation of the cross-section of the passage of the air channel; at least one coil fixed in said valve between said magents to create a magnetic field, said control device having means to feed this coil with a direct current alternatively in one and the other direction during a given time interval, the obturation member comprising a membrane having a bottom and a frustoconical rigid wall, the bottom being connected to said shaft, the periphery of the frustoconical portion being connected through a flexible membrane portion to the body of the valve.

2. Valve according to claim 1, which comprises, located on either side of the coils and fastened to the valve, iron washers cooperating each with one of the permanent magnets.

3. Valve according to claim 1, in which at least one of the permanent magnets is fixed on the shaft in an adjustable manner permitting modifying the distance separating the two magnets and thus the axial stroke of said shaft.

4. Automatic regulating valve of the air flow sucked out from a room through a mechanical ventilation installation comprising a channel to suck air the cross-section of which depends on the position of an obturating member subjected to the action of an actuating device itself controlled by a control device, the actuating device of the obturation member comprising a shaft sliding axially in a portion of the body of the valve, one end of which is fast with the obturation member, two permanent magnets carried by said shaft and separated the one from the other by a distance defining the variation of the cross-section of the passage of the air channel; at least one coil fixed in said valve between said magnets to create a magnetic field, said control device having means to feed this coil with a direct current alternatively in one and the other direction during a given time interval, a fixed portion adapted to be fixed onto a wall comprising a frustoconical skirt extending within a secondary ventilation channel and a flange covering a part of the wall surrounding the channel, and a removable cover portion which can be removably plugged in said fixed portion and which defines a ventilation passage between said cover portion and said flange.

5. Valve according to claim 4, in which the removable portion comprises the obturation member, the actuating device and the control device.

6. Valve according to claim 5, in which the fixed portion comprises a plug and the accessible portion of a corresponding plug cooperating, in the plugged-in position of these portions, to feed the control device and actuating device with electrical current.

7. Valve according to claim 4, a rigid frustoconical portion of the obturation member extending approximately parallel to the skirt of the fixed portion of the valve.

* * * * *